July 7, 1959  D. D. CRAWFORD  2,893,478
TRUCK TIRE BEAD BREAKER
Filed July 3, 1957
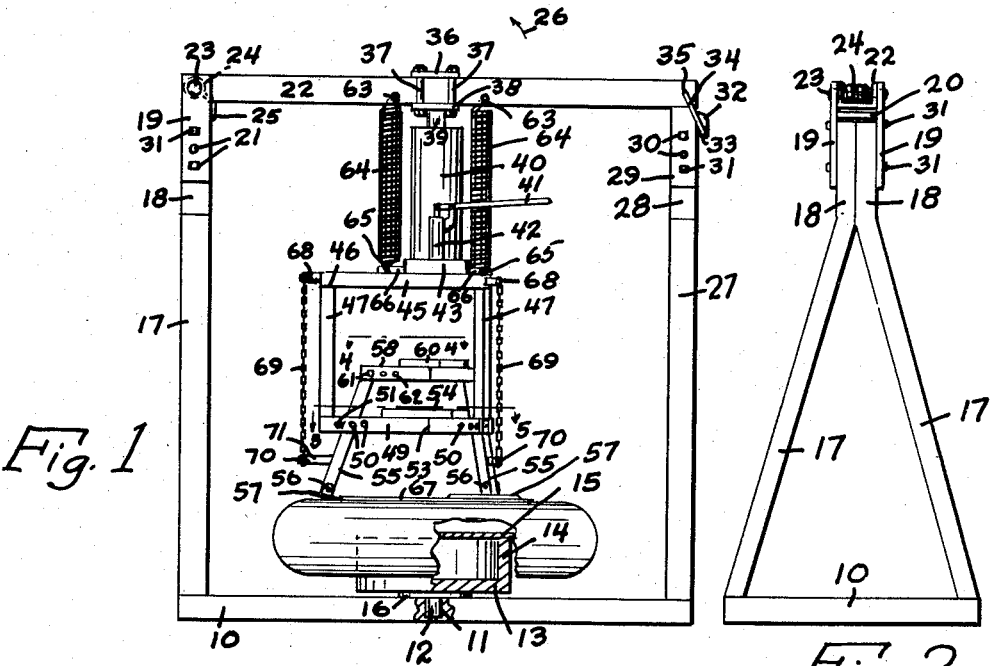
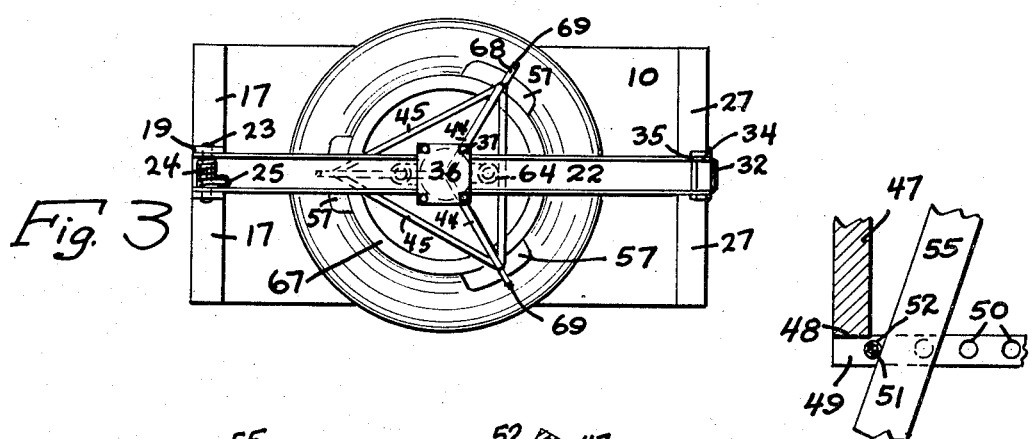
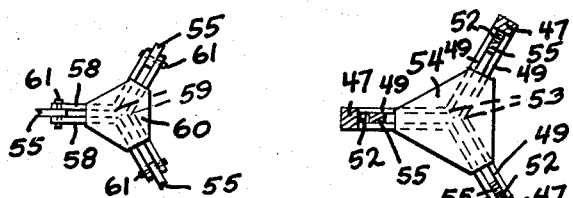
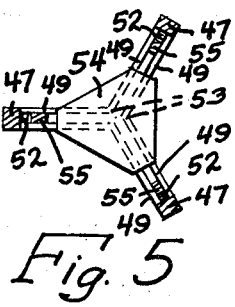
INVENTOR.
Donald D. Crawford
BY
Sam J. Slotky
ATTORNEY

United States Patent Office 2,893,478
Patented July 7, 1959

2,893,478
TRUCK TIRE BEAD BREAKER
Donald D. Crawford, Oto, Iowa
Application July 3, 1957, Serial No. 669,878
3 Claims. (Cl. 157—1.2)

My invention relates to a truck tire bead breaker.

An object of my invention is to provide a truck tire bead breaker which will apply a maximum amount of pressure in the right direction to break the bead away from the rim of the tire, and which can be used on different type of tires as well as different sizes of tires.

A further object of my invention is to provide a device which can be conveniently manipulated.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of my device with a fragmentary section,

Figure 2 is an end view of the device,

Figure 3 is a plan view of the device,

Figure 4 is a sectional view taken along the lines 4—4 of Figure 1,

Figure 5 is a sectional view taken along the lines 5—5 of Figure 1, and

Figure 6 is an enlarged detail of the roller and pin arrangement.

My invention contemplates the provision of a device which will automatically break the bead of a tire from the rim, which is operated by suitable hydraulic pressure means, and which will include a convenient arrangement for manipulating the same.

I have used the character 10 to designate the base of the device, and provided in the base 10 centrally thereof is an opening 11 which receives the pin 12, which pin is secured to the turn-table which comprises the hollow member having the base portion 13 and cylindrical side wall 14, the disc 15 of the tire being adapted to rest upon the upper edge of the wall 14. The base 13 can include the slightly raised portion 16 to provide a bearing surface and so that the arrangement can be rotated when desired.

I have further used the character 17 to indicate a pair of end members to provide brackets which terminate in the vertically positioned portions 18. The portions 18 are welded together and receive a substantially H-shaped piece 19 having a transverse web 20. The member 19 has a plurality of openings 21 whereby it can be mounted on the portions 18 at pre-selected heights according to the tire requirements. Received within the upper part of the member 19 is the longitudinally positioned channel member 22 which swings upon the pin 23 which passes through the members 19 and 22, and receiving the pin 23 is a strong torsion spring 24 having the end 25 attached against the upper portion of the member 18 as shown in Figure 1, to assist in the raising action when the channel 22 is swung upwardly in the direction of the arrow 26.

Attached at the other end of the arrangement are the further supporting bracket members 27 terminating in portions 28 which are received within a further U-shaped member 29 having the openings 30 therein for similar adjusting purposes, the openings 21 and 30 being adapted to receive the suitable bolts 31, and attached to the member 29 is a keeper 32 under which is secured at 33 the latching member 34 which is pivoted at 35 to the member 22, this arrangement permitting unlatching of the member 22 so that it can be raised when changing tires.

Resting upon the channel 22 is a plate 36 which receives the bolts 37 which are bolted to a further plate 38, the plate 38 providing the top of a hydraulic, or mechanical, jack arrangement, whichever is desired, and which is attached to the piston rod 39 which operates within the cylinder 40, the character 41 indicating a jack handle operating the small cylinder 42, the present arrangement describing a hydraulic cylinder preferably.

The base 43 of the jack rests upon the framework members 44 which terminate centrally and to which are attached the further braces 45, and attached at the ends of these members at 46 are the vertically positioned posts 47, which posts 47 are secured as at 48 (see Figure 6) to the spaced members 49 having a plurality of openings 50 therein, any one of which openings will receive the pins 51 carrying the rollers 52 journalled thereon.

These spaced members 49 are positioned so that they are approximately 120° apart and joined together at 53 (see Figure 5) with a plate 54 being provided for rigidity. Received between the members 49 are the three bars 55 to which are pivotally attached at 56 the shoes 57.

A further upper framework comprising the pairs of members 58 is provided, which members join at 59 (see Figure 4) and which are rigidified by means of the plate 60, the upper ends of the bars 55 being pivotally secured by suitable bolts as at 61 with any one of the selected openings 62 in the portions 58.

Attached at 63 to the beam or channel member 22 are the strong coiled springs 64 which are attached at 65 to the ears 66 which extend outwardly from the base portion 43 of the jack, the base portion 43 of course being rigidly secured to the members 44.

The arrangement operates in the following manner. The tire is placed upon the turn-table member 14 as shown, and the handle 41 of the hydraulic unit is pumped, which correspondingly will expand the piston rod 39, and at the same time forcing the bars 47 downwardly, whereby the rollers 52 will bear against the bars 55 to thereby force the shoes 57 downwardly and inwardly within the rim 67, the combined effect completely loosening the bead of the tire. The various openings at 50 and 62 permit adjustment to accommodate any angle desired to the bars 55 and to also accommodate various sizes of tires.

Extending from the terminals of the portions 44 and 45 are the projecting bars 68 which are attached to the chains 69 which are attached at 70 to the bar portions 71, which portions 71 are secured to the bars 55.

As soon as the pressure is released from the hydraulic jack, the springs 64 will pull the entire arrangement upwardly by virtue of these chains, etc., so that the tire can be rotated partially and the shoes brought down again in new locations, so that as a result the entire periphery of the bead can be released from the rim.

As explained heretofore also, by releasing the catch member 34, the beam 22 can be swung upwardly assisted by the torsion spring 24 when changing tires and the like.

It will be noted that the inner edges of the shoes 57 are substantially arcuate to fit the contour of the rim.

It should be specifically understood that slight modifications could be made in my invention without departing from the essential spirit of my invention, and it will be noted that I have accomplished the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A truck tire bead breaker comprising a framework, said framework including a pair of end supports, a longitudinally positioned bar attached to the tops of said end supports, means for pivoting said bar to one of said supports, and means for locking the other end of said bar to the other of said supports, an expansible hydraulic jacking unit dependingly attached at one end to said bar, a second framework dependingly attached to the other end of said hydraulic jacking unit, vertically positioned rods attached at their upper ends to said second framework, a third framework secured to the lower ends of said vertically positioned rods and including rollers, a fourth framework positioned between the second and third frameworks, substantially angularly positioned further bars pivoted at their tops to said fourth framework and bearing with their outer edges against said rollers, shoes pivotally attached at the bottom of said further bars adapted to bear against a tire bead.

2. A truck tire bead breaker comprising a framework, said framework including a pair of end supports, a longitudinally positioned bar attached to the tops of said end supports, means for pivoting said bar to one of said supports, and means for locking the other end of said bar to the other of said supports, an expansible hydraulic jacking unit dependingly attached at one end to said bar, a second framework dependingly attached to the other end of said hydraulic jacking unit, vertically positioned rods attached at their upper ends to said second framework, a third framework secured to the lower ends of said vertically positioned rods and including rollers, a fourth framework positioned between the second and third frameworks, substantially angularly positioned further bars pivoted at their tops to said fourth framework and bearing with their outer edges against said rollers, shoes pivotally attached at the bottom of said further bars adapted to bear against a tire bead, springs attached to said longitudinally positioned bar and to the base of said hydraulic jacking unit for raising said second framework, said third framework, and said fourth framework upon release of pressure in said hydraulic jacking unit, chains connecting said second framework and said further bars.

3. A truck tire bead breaker comprising a framework, said framework including a pair of end supports, a longitudinally positioned bar attached to the tops of said end supports, means for pivoting said bar to one of said supports, and means for locking the other end of said bar to the other of said supports, an expansible hydraulic jacking unit dependingly attached at one end to said bar, a second framework dependingly attached to the other end of said hydraulic jacking unit, vertically positioned rods attached at their upper ends to said second framework, a third framework secured to the lower ends of said vertically positioned rods and including rollers, a fourth framework positioned between the second and third frameworks, substantially angularly positioned further bars pivoted at their tops to said fourth framework and bearing with their outer edges against said rollers, shoes pivotally attached at the bottom of said further bars adapted to bear against a tire bead, springs attached to said longitudinally positioned bar and to the base of said hydraulic jacking unit for raising said second framework, said third framework, and said fourth framework upon release of pressure in said hydraulic jacking unit, chains connecting said second framework and said further bars, a rotatable turn-table mounted at the bottom of said first-mentioned framework, said turn-table adapted to receive a tire and rim thereon, means for adjustably lengthening said end supports, said fourth framework including spaced openings for permitting adjustable pivoting of said further bars, said third framework including adjustable openings for permitting adjustable positioning of said rollers.

References Cited in the file of this patent

UNITED STATES PATENTS

| | | |
|---|---|---|
| 2,387,839 | Frost | Oct. 30, 1945 |
| 2,406,996 | Colley | Sept. 3, 1946 |
| 2,495,118 | McCollister | Jan. 17, 1950 |
| 2,537,041 | Finch | Jan. 9, 1951 |
| 2,730,166 | Davidson et al. | Jan. 10, 1956 |